Figure 1:
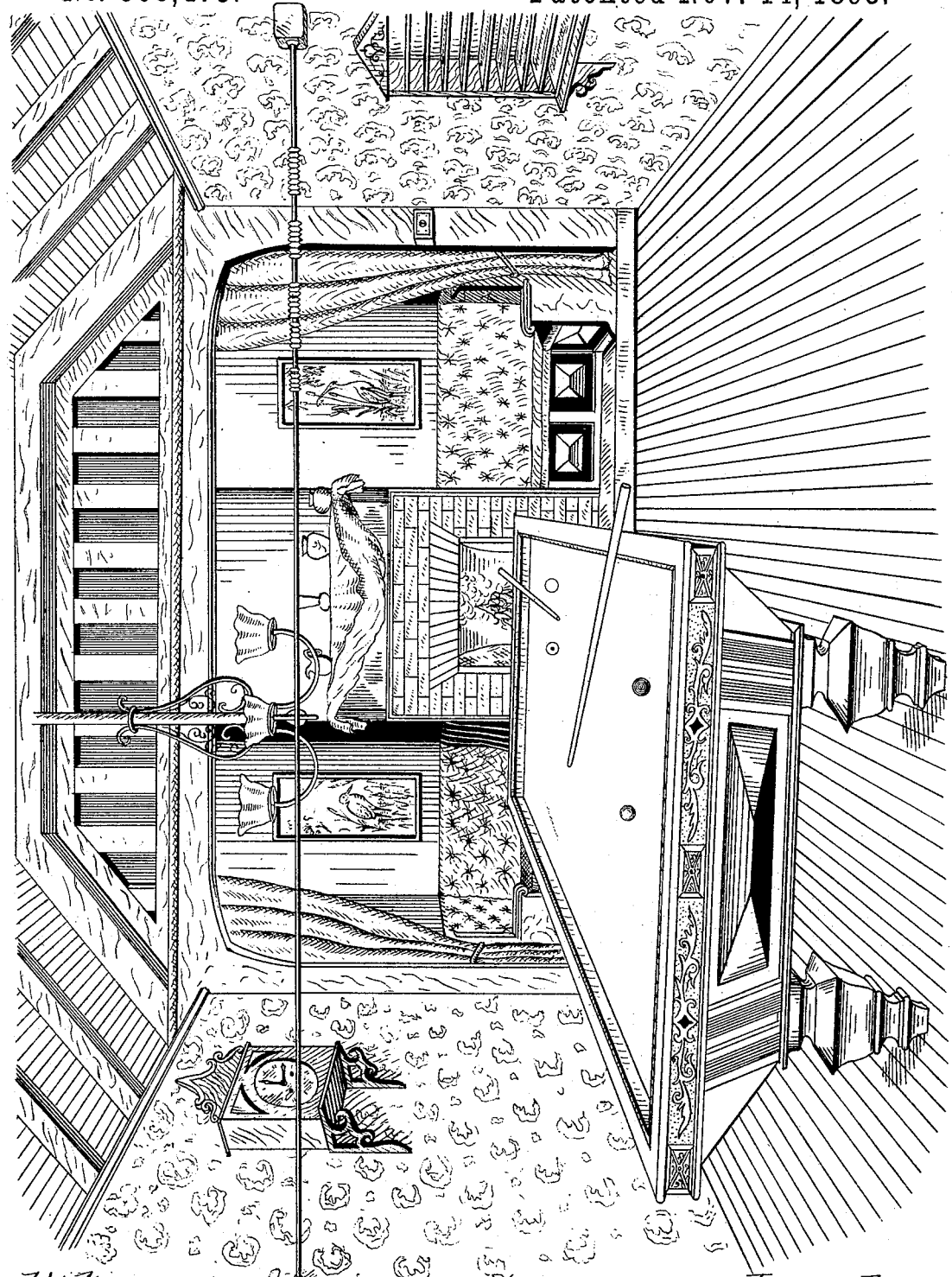

(No Model.) 8 Sheets—Sheet 1.

C. B. HOPKINS.
AUTOMATIC TIME CHECK FOR BILLIARD GAMES.

No. 508,473. Patented Nov. 14, 1893.

Witnesses:
George L. Cragg
George McMahon

Inventor:
Charles B. Hopkins
By Barton & Brown
Att'ys

THE NATIONAL LITHOGRAPHING COMPANY,
WASHINGTON, D. C.

(No Model.) 8 Sheets—Sheet 2.
C. B. HOPKINS.
AUTOMATIC TIME CHECK FOR BILLIARD GAMES.
No. 508,473. Patented Nov. 14, 1893.
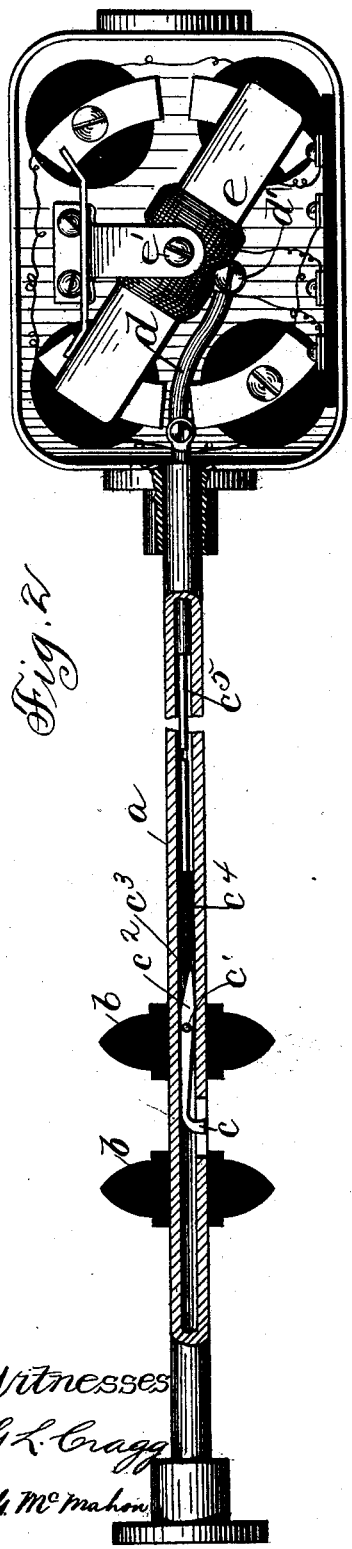
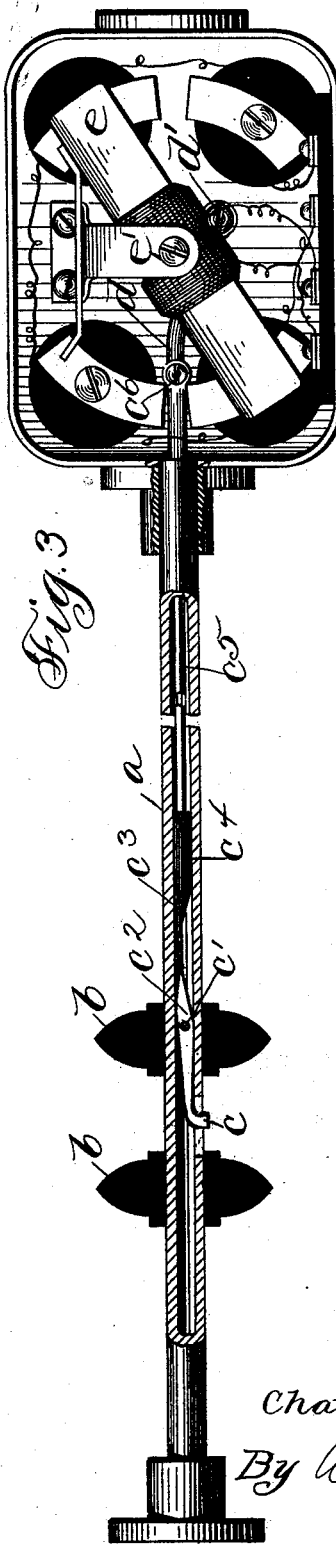
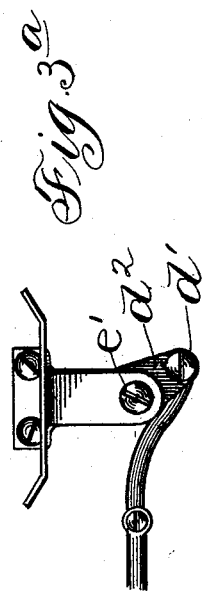
Witnesses
G. L. Cragg
G. McMahon
Inventor:
Charles B. Hopkins.
By Barton & Brown
Att'ys

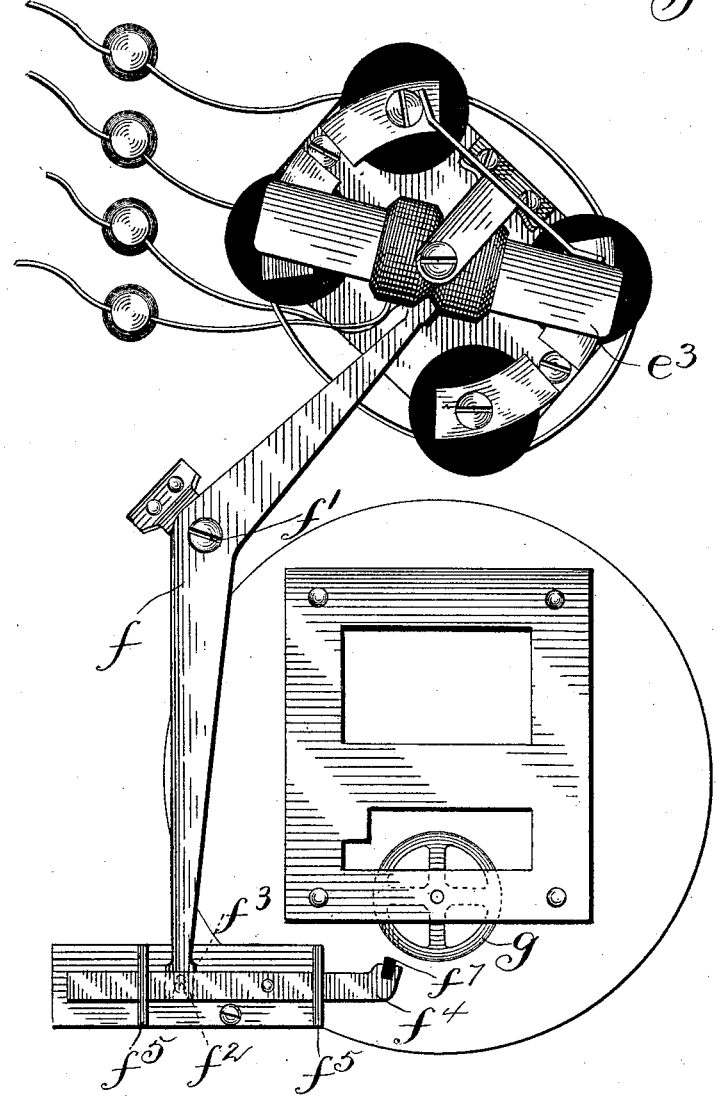

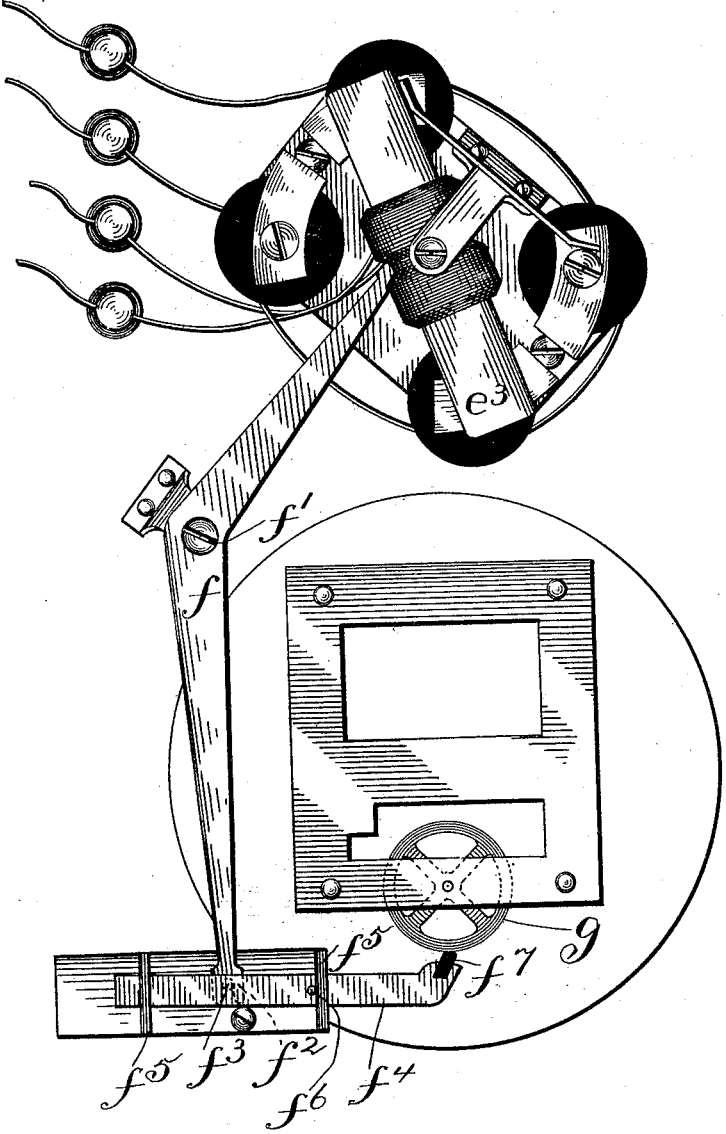

(No Model.) 8 Sheets—Sheet 5.
C. B. HOPKINS.
AUTOMATIC TIME CHECK FOR BILLIARD GAMES.
No. 508,473. Patented Nov. 14, 1893.
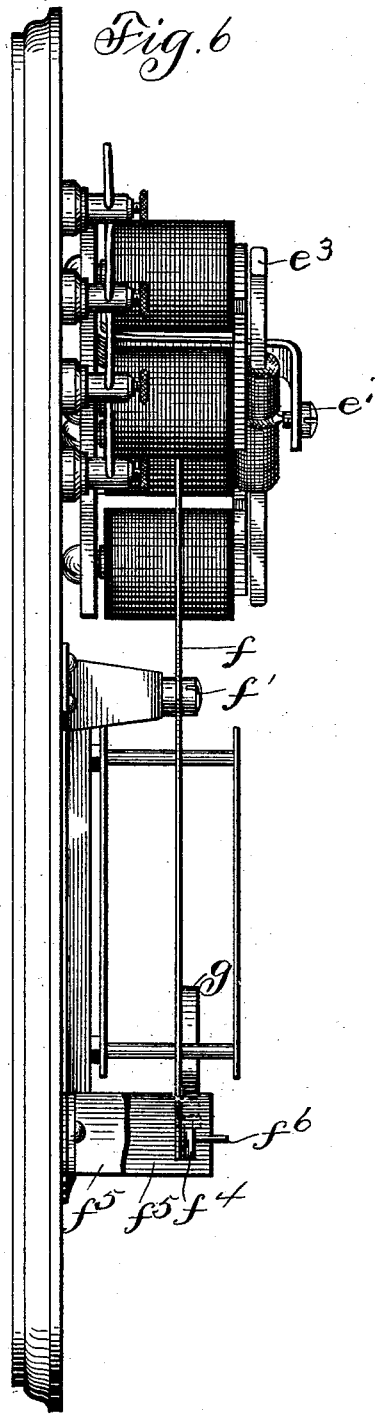
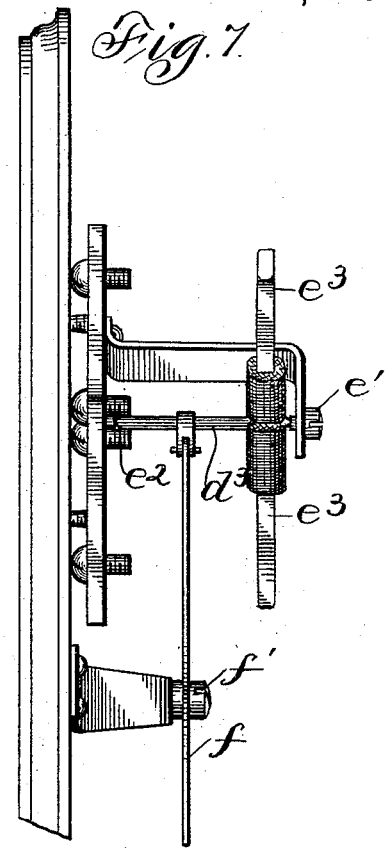
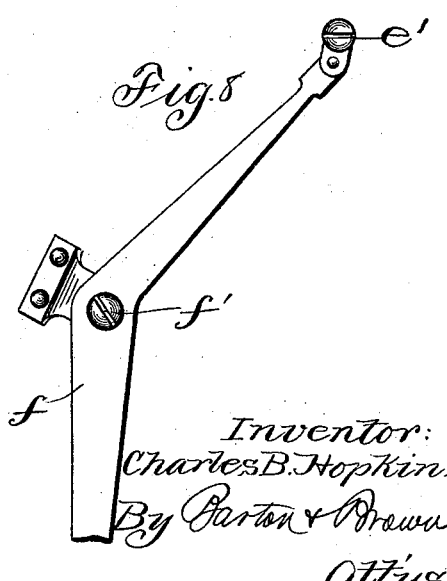
Witnesses:
George L. Cragg
George McMahon
Inventor:
Charles B. Hopkins.
By Barton & Brown
Atty's.

(No Model.) 8 Sheets—Sheet 6.
C. B. HOPKINS.
AUTOMATIC TIME CHECK FOR BILLIARD GAMES.
No. 508,473. Patented Nov. 14, 1893.
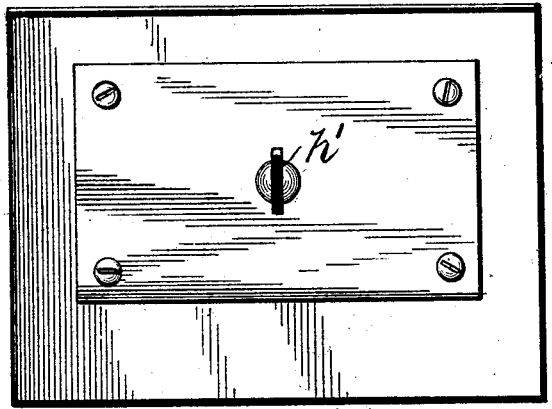
Fig. 9.
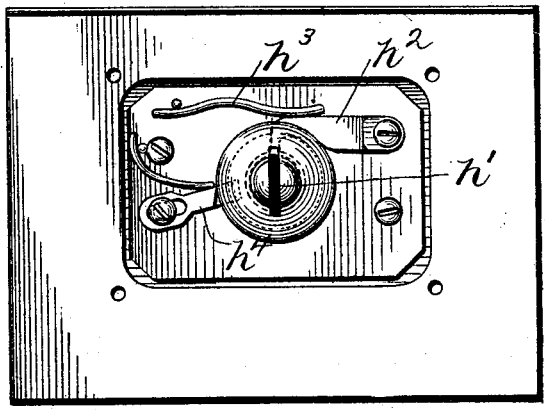
Fig. 10.
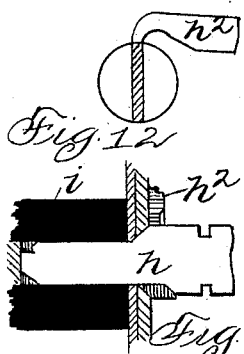
Fig. 12.
Fig. 13.
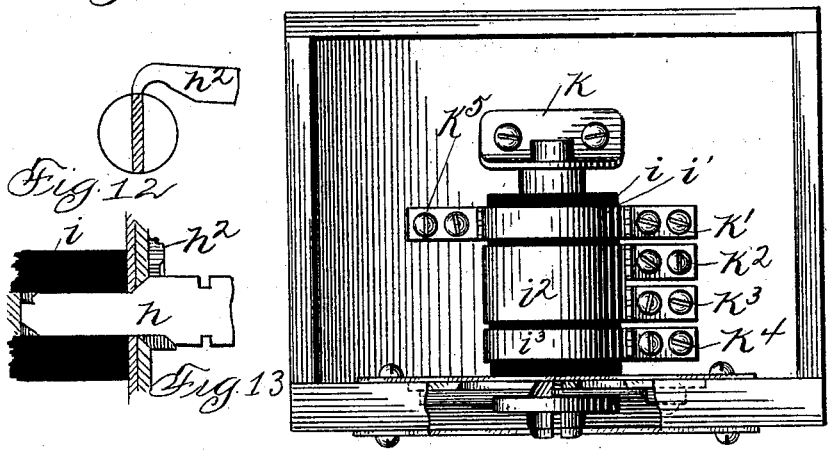
Fig. 11.
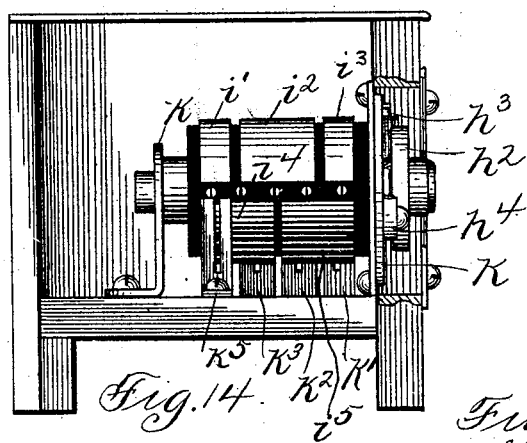
Fig. 14.
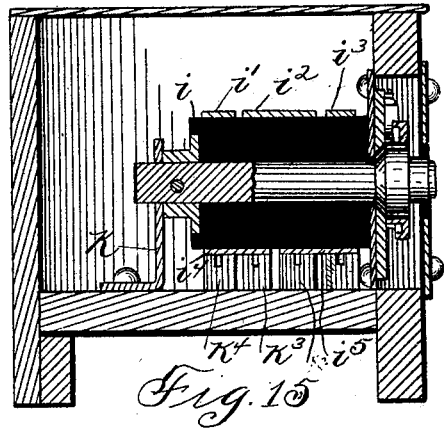
Fig. 15.
Witnesses
George L. Cragg.
George McMahon.
Fig. 16
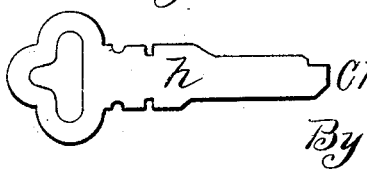
Inventor.
Charles B. Hopkins
By Barton & Brown
Attys.
THE NATIONAL LITHOGRAPHING COMPANY,
WASHINGTON, D. C.

(No Model.) 8 Sheets—Sheet 7.
C. B. HOPKINS.
AUTOMATIC TIME CHECK FOR BILLIARD GAMES.
No. 508,473. Patented Nov. 14, 1893.
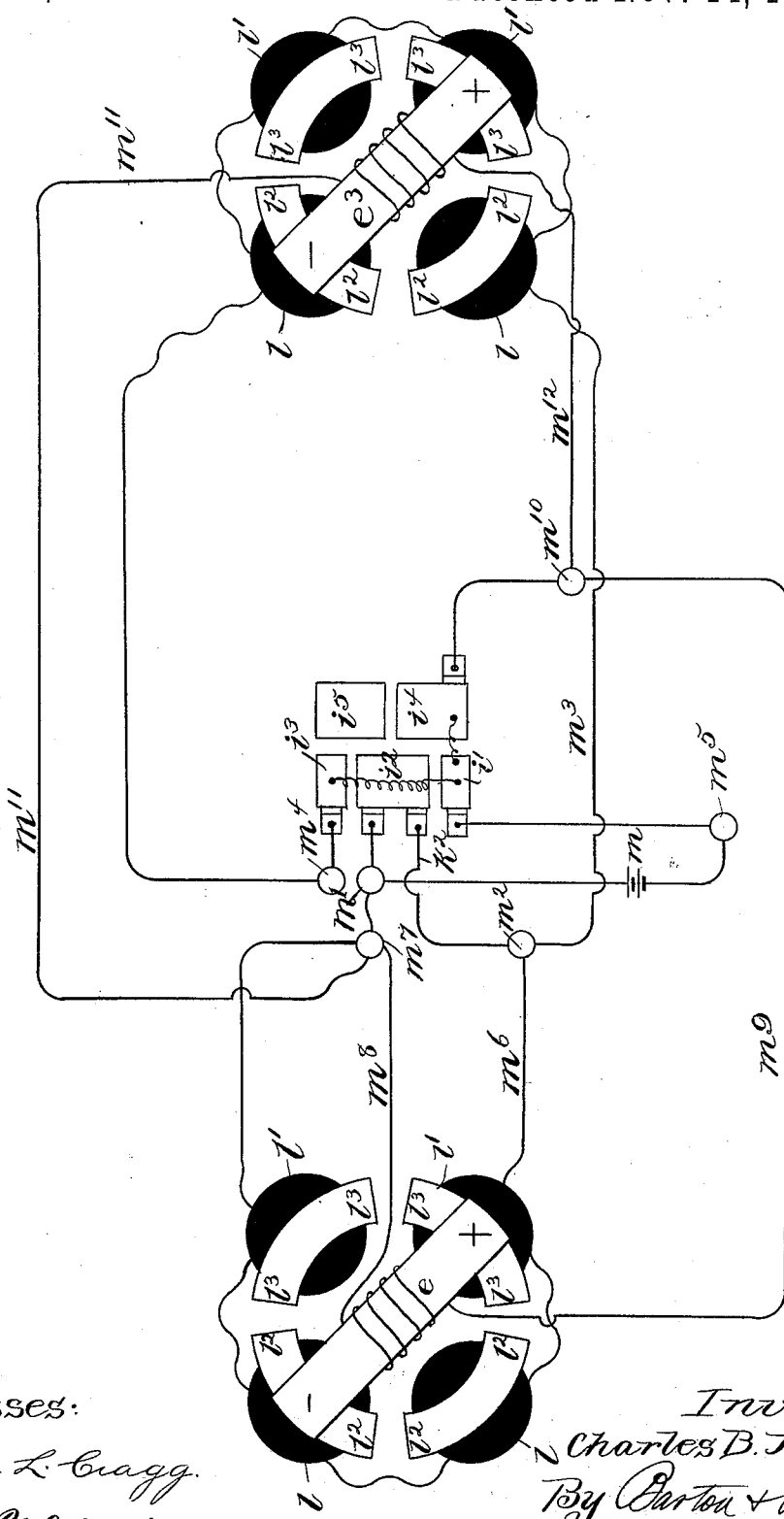
Witnesses:
George L. Cragg.
George McMahon.
Inventor:
Charles B. Hopkins
By Barton & Brown
Attys

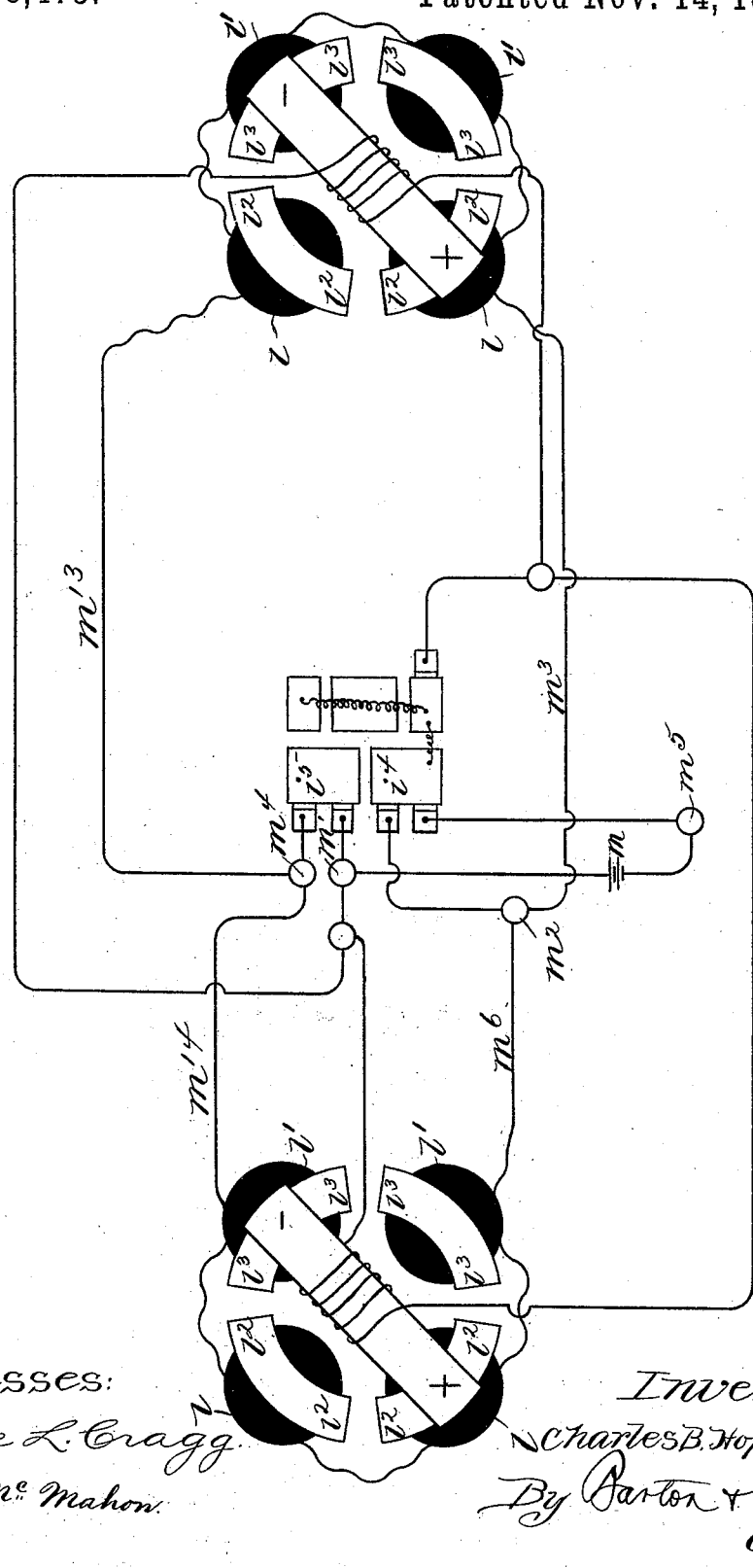

UNITED STATES PATENT OFFICE.

CHARLES B. HOPKINS, OF SPOKANE, WASHINGTON.

AUTOMATIC TIME-CHECK FOR BILLIARD-GAMES.

SPECIFICATION forming part of Letters Patent No. 508,473, dated November 14, 1893.

Application filed December 27, 1892. Serial No. 456,472. (No model.)

*To all whom it may concern:*

Be it known that I, CHARLES B. HOPKINS, a citizen of the United States, residing at Spokane, in the county of Spokane and State of Washington, have invented a certain new and useful Improvement in Automatic Time-Checks for Billiard-Games, (Case No. 1,) of which the following is a full, clear, concise, and exact description, reference being had to the accompanying drawings, forming a part of this specification.

My invention relates to automatic time checks, and its object is to provide a means of enabling an owner of billiard or pool tables to know what amount of patronage he has received, and thereby check up his financial clerk. When billiard or pool tables are paid for by the hour a clock is used, and where paid for by the game or cue some other form of register is used. The operation of the register is effected by the putting into service of some part of the paraphernalia necessary for playing the game.

My invention consists of means for starting and stopping a clock or for controlling other register, which means is automatically operated by the putting into service of some of the utensils of the game.

My invention further consists of the arrangement of the circuits of the apparatus, which will be hereinafter more fully described and which will be more readily understood by reference to the accompanying drawings, of which—

Figure 1 represents a billiard room showing the apparatus of my invention in place. Fig. 2 represents partially in section the apparatus which releases the counting buttons so that they may be used. Fig. 3 represents the same apparatus shown in Fig. 2, but with the detent in position to prevent the use of the buttons, and the actuating mechanism in a corresponding position. Fig. 3ª represents a detail of the crank which operates the detent. Fig. 4 is a front elevation of the actuating mechanism for starting and stopping the clock, the clock mechanism being represented only by the balance wheel to which the brake is applied to stop it. Fig. 5 is a front elevation of the same apparatus as shown in Fig. 4, but with the brake applied to the balance wheel. Fig. 6 is a side elevation of Fig. 5 with the brake upon the balance wheel. Fig. 7 is a side elevation of a portion of the mechanism shown in Fig. 6 with the magnets removed. Fig. 8 shows the details of the lever which operates the brake. Fig. 9 is a front elevation of the box containing the pole changing switch. Fig. 10 shows the same with the front metal plate removed. Fig. 11 is a top view of the pole changing switch. Figs. 12 and 13 show details of the lock attachment for rotating the pole changing switch. Fig. 14 is a side elevation of the pole changing switch. Fig. 15 is a partial sectional view of the pole changing switch. Fig. 16 represents the key which operates the pole changing switch. Fig. 17 shows a diagram of the circuits I use with the pole changing switch in one position. Fig. 18 shows a diagram of the circuits which I use with the pole changing switch in another position.

Similar letters of reference indicate similar parts throughout the different drawings.

Upon the tube $a$ the buttons $b\,b$ are adapted to slide freely. The detent $c$ is pivoted at $c'$ and has the beveled bearing surface $c^3$ upon which the correspondingly beveled surface $c^3$ of the horizontal plunger $c^4$ is adapted to press; this plunger $c^4$ is the terminus of the rod $c^5$ which has a horizontal excursion in tube $a$, being actuated by the crank $d$ which is pivoted at $d'$ to the arm $d^2$ which is carried upon supporting rod $d^3$, which is rigidly attached to and moves with the armature $e$. The supporting rod $d^3$ is pivoted at $e'$ and $e^2$ and it will thus be seen that the partial rotation of the armature causes a rocking motion of the arm $d^2$, which thus imparts through the crank $d$ the longitudinal motion of rod $c^5$ which is pivoted at $c^6$ to said crank $d$. This longitudinal motion of rod $c^5$ by means of the beveled bearing surface of plunger $c^4$ operates to raise and to lower the detent, as shown first in its raised condition in Fig. 2, and in the position which it assumes by the force of gravity when the plunger $c^4$ is withdrawn, in Fig. 3. When the detent is in the position shown in Fig. 3 the buttons cannot be slid upon the tube $a$ throughout its length. The detent, therefore, is so located that it is impossible to use the buttons for counting a game when it is in the position shown in Fig. 3, and in order to raise this detent and thus permit the buttons to be used it is necessary to turn the pole changing switch, as will hereinafter be described, and this process removes the brake from the balance wheel of the clock and sets the mechanism of the clock in motion, thereby registering the time of starting the game; all of which will be more fully set forth hereinafter. The armature $e^3$ similarly supported upon a pivoted supporting rod $d^3$ and adapted to be swung through the arc of a circle, as will be hereinafter described, serves to operate the crank $f$ pivoted at $f'$, which, by means of the forked end $f^2$ which straddles the pin $f^3$ serves to move the sliding bar $f^4$ which is supported upon the arms $f^5 f^5$. The pin $f^6$ limits the excursion of the horizontal sliding bar $f^4$. Upon the end of this bar is provided the brake $f^7$, preferably of leather, felt, rubber, or some similar soft material which may bear upon the balance wheel $g$ of the clock and thus stop the motion thereof, and thereby arrest the clock mechanism. It is obvious that the stopping of the clock mechanism may be accomplished by applying the brake to some other part of the train of wheels.

The apparatus of this system of my invention is so adjusted that the armature $e^3$ is caused to assume a position which will liberate the clock mechanism at the same time that the detent $c$ is caused to assume the position shown in Fig. 2, and the brake $f^7$ is applied to the mechanism of the clock by means of the swinging of the armature $e^3$ to the position shown in Fig. 5 when the detent is caused to assume the position shown in Fig. 3. Thus when the clock is stopped the buttons cannot be used, and when the buttons are liberated the clock mechanism is set in motion.

The details of the pole changing switch which reverses the current within the magnet coils that operate the armatures and thus the clock mechanism, and the detent controlling the buttons, are shown in Figs. 9, 10, 11, 12, 13, 14 and 15.

The key $h$ shown in Fig. 16, is adapted to fit the key hole $h'$. The dog $h^2$ is adapted to drop into the channel $h'$ being pressed in that direction by the spring $h^3$. The adjustable brake $h^4$ bears against an extension of the cylinder $i'$, thereby holding it in any position to which it is turned. The insertion of the key into the key hole raises the dog $h^2$ and permits the cylinder $i$ bearing the contact strips $i'$, $i^2$, $i^3$, $i^4$ and $i^5$ to rotate in bearings $k$ $k$. The brushes $k'$, $k^2$, $k^3$, $k^4$ and $k^5$ are arranged to bear upon the contact springs in the manner shown in Figs. 11, 14 and 15. The cylinder $i$ is preferably allowed to turn only in one direction, being held by the dog $h^4$, as already shown.

I will now proceed to describe the diagrams of circuits in Figs. 17 and 18.

We will suppose that in the diagram shown in Fig. 17 the armatures are represented as being in the position shown in Figs. 2 and 4. Adjoining electro-magnets $l$ $l$ of each of the series constituting the motor mechanisms of the button detent and the clock brake, are wound in the same direction, while the other electro-magnets of the series $l'$ $l'$ are wound in the opposite direction. The armatures $e$ $e^3$ I make of soft iron about which I wind a coil, thus polarizing the armatures when the current passes in the circuit. When the current passing through the circuit, which includes the series of electro-magnets, makes of the extensions $l^2$ $l^2$, which I preferably make in the form of a segment of a ring, north magnetic poles, the south pole of the armature $e$ $e^3$ will be attracted thereby and at the same time the polar extensions $l^3$ $l^3$ of electro-magnets $l'$ $l'$ being, on account of the opposite winding of the electro-magnets, south poles, the north poles of the armatures $e$ $e^3$ will be attracted, the armatures thus being in the position shown in Fig. 17. But the direction of the current being reversed in the circuit including the series of electro-magnets, electro-magnets $l'$ $l'$ will polarize their extensions $l^3$ $l^3$ in the opposite sense; that is to say, north, and at the same time polar extensions $l^2$ $l^2$ of magnets $l$ $l$ will become polarized south, thus the north poles of the armatures $e$ $e^3$, which are marked +, will be attracted by polar extension $l^2$ nearest it, and the south pole of the armatures $e$ $e^3$, which are marked —, will be attracted by the polar extension $l^3$ nearest it, thus causing the armatures $e$ $e^3$ to assume the position shown in Fig. 18. The pole changing switch diagrammatically shown in Figs. 17 and 18 in the two positions which it is made to occupy by the rotation of the cylinder bearing the contact plates, operates to change the direction of the current through the series of electro-magnets without, however, operating to change the direction of the current through the coil surrounding the armatures $e$ $e^3$.

As will be seen by reference to Fig. 17, starting from the source of electricity $m$ I trace the circuit to binding post $m'$, through contact plate $i^2$ by way of contact brush $k^2$ to binding post $m^2$, at which point it divides, half of it going through the series of magnets of the motor mechanism attached to the clock work, and half through the series of electro-magnets of the motor mechanism operating the button detent. Tracing this on through the circuit $m^3$ I see that it passes in turn all the electro-magnets, thence to the binding post $m^4$, thence to contact plate $i'$ which is electrically connected with $i^3$, thence to binding post $m^5$ and to the source of electricity. From binding post $m^2$ by circuit $m^6$ through the series of electro-magnets contained therein, I reach binding post $m^4$ and thence back to the source of electricity $m$ by the route already described.

For the circuit containing the coil about the armatures $e^3$ I will start as before from the source of electricity $m$ to the binding post $m'$, thence to binding post $m^7$, thence by the circuit $m^8$ around the armature $e$, thence by the circuit $m^9$ to binding post $m^{10}$, to contact plate $i^4$ and $i'$, which is electrically connected therewith, to binding posts $m^5$ and to the source of electricity $m$.

The other armature is in the circuit which I will trace beginning with the binding post $m'$ and $m^7$ by way of the circuit $m^{11}$, through the coil surrounding the armature, and the circuit $m^{12}$ to binding post $m^{10}$ and thence back to the source of electricity by the route already described.

Referring to Fig. 18, I start from the source of electricity $m$, as before, to binding post $m'$, I reach series of electro-magnets through the circuit $m^{13}$ with a current in the opposite direction from that which flowed through the magnets in position of the pole changing switch shown in Fig. 17, the current returning by the circuit $m^3$ to binding post $m^2$, thence to contact plate $i^4$ and back to the source of electricity by the binding post $m^5$. Starting from the binding post $m'$ for the other series of electromagnets, I pass by way of the contact plate $i^5$ to binding post $m^4$ and circuit $m^{14}$ through the series of electro-magnets in a direction the opposite from that in which the current flows when the pole changing switch is in the position shown in Fig. 17, and thence by the circuit $m^6$ to binding post $m^2$, through contact plate $i^4$ to binding post $m^5$ and source of electricity. In the position shown in Fig. 18, however, as in Fig. 17, the current flows through the coils upon the armatures $e\ e^3$ in the same direction.

While I have described my invention by referring to particular mechanism in detail, I do not wish to limit myself to the particular construction of forms of apparatus shown and described. Other forms of pole changing switch will readily suggest themselves and other motor devices for starting and stopping the clock and for operating the button detent may readily be found. It is apparent that the clock may be located at any desired point, either by the table where the game is to be played, or at the cashier's desk, or at some more remote point.

Although having described my invention in connection with a time keeping register, it is obvious that other registers may be employed.

Having thus described my invention, what I claim as new, and desire to secure by Letters Patent, is—

1. An automatic check for billiard games, consisting of a detent, and means for raising or lowering the same to permit or prevent the use of the counting buttons, and a clock, provided with means adapted to start said clock when said detent is raised, and to stop the same when said detent is lowered again, substantially as described.

2. In an automatic time check for billiard games, the combination with a clock adapted to be automatically started and stopped, of a detent adapted to release or lock the buttons, a motor mechanism for starting the clock, and a second motor mechanism actuated simultaneously therewith for raising the detent; whereby the clock will begin to register the time whenever the buttons are released, substantially as described.

3. In an automatic time check for billiard games, the combination with means for releasing and locking the counting buttons, of a clock mechanism, a brake adapted to bear upon said clock mechanism, a motor device adapted to operate said brake to stop or release said clock, and means adapted to operate said motor mechanism to release said clock mechanism simultaneously with the releasing of the buttons, said means being also adapted to operate said motor mechanism to stop said clock mechanism simultaneously with the locking of said buttons, substantially as described.

4. In an automatic time check for billiard games, the combination with a detent adapted to secure the counting buttons, of a motor mechanism adapted to operate said detent to release or to lock said buttons, and a clock adapted to start when said motor mechanism operates to raise said detent to release said buttons, said clock being adapted to stop when said motor mechanism operates to lower said detent to lock said buttons, substantially as described.

5. In an automatic time check for billiard games, the combination with the clock, of a motor mechanism adapted to start and stop the same, a detent adapted to release and lock the counting buttons, a motor mechanism adapted to operate said detent, and means for controlling the operation of said motor mechanisms so that when said detent is raised by the one, the clock will simultaneously be started by the other, and when the detent is lowered by the one, the clock will be simultaneously stopped by the other, substantially as described.

6. In an automatic time check for billiard games, the combination with clock mechanism, of a brake adapted to bear upon a portion thereof, said brake being operated by a lever, an armature to which said lever is attached, electro-magnets adapted to cause said armature to rock, a source of electricity in circuit with said magnets, a pole changing switch adapted to reverse the current in said electro-magnets and thereby cause the armature to drop in the other direction, a detent adapted to release and lock the counting buttons, and means for automatically operating said detent; whereby when the buttons are released the clock will be free to run, and when the buttons are locked the clock will be stopped, substantially as and for the purpose specified.

7. In an automatic time check for billiard games, the combination with a detent adapted to release and to lock the counting buttons, and motor mechanism connected therewith, said motor mechanism consisting of a rocking armature, magnets adapted to cause said armature to rock, pole changing switch adapted to change the direction of current in said magnets, and a clock adapted to be released when said detent is raised and stopped when said detent is lowered; whereby when the buttons are released the clock is free to run, and when the buttons are locked the clock is stopped, substantially as and for the purpose specified.

8. The combination with the tube $a$, of the buttons $b\ b$ adapted to slide thereon, the detent $c$ adapted in its downward position to secure said buttons and in its upward position to allow said buttons to slide freely upon said tube, a horizontal plunger $c^4$ adapted to operate said detent, the crank $d$ attached to said horizontal plunger, the rod $c^5$ carrying said horizontal plunger, the crank $d$ attached to said rod $c^5$ and adapted to drive said rod $c^5$ in a horizontal direction, the armature $e$ adapted to operate said crank, and means for swinging said armature, whereby said detent is caused to rise and release said buttons, or to fall and secure said buttons, substantially as described.

9. The combination with means for securing and releasing implements used in a billiard game, of motor mechanism adapted to operate said means, said motor mechanism consisting of series of magnets, the adjoining magnets wound in the opposite direction, an armature constantly polarized in one direction, and means for reversing the current through the electro-magnets, whereby the polarized armature is caused to rock and operate the said means for securing the implements, substantially as and for the purpose specified.

10. The combination with a clock, of a brake $f^7$ adapted to engage with the mechanism thereof, the lever $f$ adapted to operate said brake to engage it with and disengage it from said clock mechanism, an armature $e^3$ adapted to operate said lever, electro-magnets adapted to cause said armature to swing, substantially as and for the purpose specified.

11. The combination with a clock, of a brake adapted to release and to stop the mechanism thereof, of a lever adapted to move said brake into and out of engagement with said clock mechanism, a pivoted armature adapted to operate said lever, a helix about said armature and in an electric circuit; whereby said armature is polarized, two or more electro-magnets with helices wound in opposite directions and means for changing the direction of current through said magnets; whereby the polarized armature is attracted and caused to swing through the arc of a circle and thus operate the stopping and starting brake of the clock, substantially as and for the purpose specified.

12. In an automatic time check for billiard games, the combination with electro-motor devices adapted to release the clock mechanism and counting buttons simultaneously, and to lock said clock mechanism and counting buttons simultaneously by a reversal of the current in said electro-motor devices, of a pole changing switch consisting of a cylinder bearing contact plates $i'$ to $i^6$ adapted to be turned only in one direction, and contact brushes $k'\ k^2\ k^3\ k^4\ k^5$, whereby the current in said electro-motor devices may be reversed when desired, substantially as described.

13. In an automatic time check for billiard games, the combination with electro-motor devices adapted to release clock mechanism and instruments for carrying on the game simultaneously, and to lock said clock mechanism and said instruments simultaneously by a reversal of current in said electro-motor devices, of a pole changing switch adapted to reverse the direction of said current, substantially as described.

14. In an automatic time check for billiard games, in combination with electro-motor mechanism adapted to lock and unlock the clock mechanism and instruments for carrying on the game, contact plates $i'\ i^2\ i^3\ i^4$ and $i^5$, contact brushes $k'\ k^2\ k^3\ k^4$ and $k^5$, battery $m$ having its poles connected respectively with brushes $k'$ and $k^3$, circuits $m^3$ and $m^6$ connected in multiple between brushes $k^2$ and $k^4$, whereby the current through said circuits $m^3$ and $m^6$ may be reversed by the reversal of the position of said plates, circuits $m^8$,—$m^9$ and $m^{11}$—$m^{12}$ connected in multiple between one side of said battery and contact brush $k^5$, said brush $k^5$ being connected continuously with the other side of said battery through plates $i'$ and $i^4$; whereby current through circuits $m^3$ and $m^6$ may be reversed without reversing the current through circuits $m^8$—$m^9$ and $m^{11}$—$m^{12}$, substantially as described.

15. In an automatic time check for billiard games, in combination with electro-motor mechanism adapted to lock and unlock the clock mechanism and instruments for carrying on the game, a pole changing switch comprising a cylinder bearing contact plates $i'\ i^2\ i^3\ i^4\ i^5$, plates $i'$, $i^3$ and $i^4$ being electrically connected together, contact brushes $k'\ k^2\ k^3\ k^4$ bearing upon said plates upon one side of said cylinder, battery $m$ having its poles connected with brushes $k'$ and $k^3$, circuits $m^3$ and $m^6$ connected in multiple between brushes $k^2$ and $k^4$, whereby the current through said circuits $m^3$ and $m^6$ may be reversed by turning said cylinder through a half revolution, contact brush $k^5$ adapted to make contact with either of said plates $i'$ and $i^4$ and connected in multiple through the circuits $m^8$—$m^9$ and $m^{11}$—$m^{12}$ with the pole of the battery $m$ opposite to that to which contact brush $k'$ is connected; whereby the current through circuits $m^3$ and $m^6$ may be reversed, while that through the circuits $m^8$—$m^9$ and $m^{11}$—$m^{12}$ remains unchanged when the cylinder is turned through a half revolution, substantially as described.

16. In an automatic time check for billiard games, in combination with electro-motor mechanism adapted to lock and unlock the clock mechanism and instruments for carrying on the game, a pole changing switch comprising a cylinder bearing contact plates and contact brushes bearing thereon, a battery connected between two of said contact brushes, a pair of parallel circuits between two other of said contact brushes; whereby the direction of the current through said circuits may be changed by the half revolution of said cylinder, a fifth contact brush and a second pair of parallel circuits between said fifth contact brush and the battery; whereby when said cylinder is given a half revolution the direction of the current through said first pair of parallel circuits will be reversed, while the direction of the circuit through the second pair of parallel circuits will remain unchanged, substantially as described.

In witness whereof I hereunto subscribe my name this 15th day of December, A. D. 1892.

CHARLES B. HOPKINS.

Witnesses:
GEORGE W. MCMAHON,
GEORGE L. CRAGG.